(12) United States Patent
Minamiura et al.

(10) Patent No.: US 7,867,665 B2
(45) Date of Patent: Jan. 11, 2011

(54) FUEL CELL STACK

(75) Inventors: Takeshi Minamiura, Gunma (JP); Goro Fujita, Ota (JP); Kenji Kibune, Gunma (JP); Takashi Yasuo, Ashikaga (JP)

(73) Assignee: Sanyo Electric Co., Ltd., Osaka (JP)

( * ) Notice: Subject to any disclaimer, the term of this patent is extended or adjusted under 35 U.S.C. 154(b) by 639 days.

(21) Appl. No.: 11/711,727

(22) Filed: Feb. 28, 2007

(65) Prior Publication Data

US 2007/0202385 A1 Aug. 30, 2007

(30) Foreign Application Priority Data

Feb. 28, 2006 (JP) ............................... 2006-054020

(51) Int. Cl.
*H01M 8/24* (2006.01)
*H01M 8/04* (2006.01)

(52) U.S. Cl. ...................... 429/456; 429/457; 429/452; 429/514

(58) Field of Classification Search ................. None
See application file for complete search history.

(56) References Cited

U.S. PATENT DOCUMENTS 6,329,093 B1   12/2001  Ohara et al.
2006/0166053 A1 *  7/2006  Badding et al. ............... 429/13

FOREIGN PATENT DOCUMENTS

| CN | 1245982 A | * | 3/2000 |
|----|-----------|---|--------|
| JP | 2000-067901 |   | 3/2000 |
| JP | 2001-110439 | * | 4/2001 |
| JP | 2004-047211 |   | 2/2004 |
| JP | 2005-005196 |   | 1/2005 |
| JP | 2005-108850 A |   | 4/2005 |
| JP | 2005-141935 |   | 6/2005 |

OTHER PUBLICATIONS

Chinese Office Action, with English translation thereof, issued in Patent Application No. 200710005104.1 dated on Jul. 4, 2008.
Japanese Notification of Reasons for Refusal, with English Translation, issued in Japanese Patent Application No. JP 2006-054020, mailed on Oct. 6, 2009.

* cited by examiner

*Primary Examiner*—Dah-Wei Yuan
*Assistant Examiner*—Angela J. Martin
(74) *Attorney, Agent, or Firm*—McDermott Will & Emery LLP

(57) ABSTRACT

Corrosion of a metal portion such as a pipe connected to a fuel cell stack is suppressed. The fuel cell stack has a plurality of single cells which generate electrical power using an aqueous methanol solution and air and are stacked in a vertical direction. An inlet of a fuel supply manifold for distributing the aqueous methanol solution to each cell and an outlet of a fuel discharge manifold for collecting the fuel discharged from the single cells are provided in a common conductive end plate. Hence, when the discharge fuel discharged from the fuel cell stack is circulated and resupplied to the stack, the potential of the discharged fuel becomes equal to that of the liquid fuel to be supplied to the stack, whereby the corrosion of the metal portion such as a pipe, a tank, a pump, or a heat exchanger is suppressed.

1 Claim, 7 Drawing Sheets

FUEL CELL STACK

BACKGROUND OF THE INVENTION

1. Field of the Invention

The present invention relates to a fuel cell stack. More particularly, the invention relates to a fuel cell stack suitable for use with a liquid fuel circulated therein.

2. Description of the Related Art

A fuel cell is a device for generating electrical energy from hydrogen and an oxidant and is capable of providing high power generation efficiency. One of the main features of a fuel cell is that electrical power is generated through direct power generation, in contrast to conventional power generation methods in which electrical power is generated via thermal or kinetic energy processes. Therefore, in a fuel cell, high power generation efficiency can be expected even in small-scale systems. Furthermore, a fuel cell is considered to be highly environmentally friendly as it emits less nitrogen compounds and the like and generates less noise and vibration than conventional power generation methods. As mentioned above, a fuel cell can effectively utilize the chemical energy contained in fuel and has environmentally friendly characteristics. Therefore, the fuel cell is expected to serve as an energy supply system of the 21st century and has received attention as a promising new power generation system for use in various applications from small to large scale power generation systems, space devices, automobiles, and portable devices. Thus, the technological development of the fuel cell for practical use is well under way.

In recent years, a direct methanol fuel cell (DMFC) has received particular attention as a promising type of fuel cell. In a DMFC, methanol serving as a fuel is supplied directly to the anode without modification to obtain electrical power through the electrochemical reaction of the methanol with oxygen. In comparison to hydrogen, methanol has higher energy per unit volume and a lower risk of explosion or the like and is also suitable for storage. Thus, a DMFC is expected to be employed as a power source for automobiles, portable devices, and the like.

Japanese Patent Laid-Open Publication No. 2005-108850 discloses a fuel cell stack which is composed of a plurality of stacked cells sandwiched between a pair of end plates with collectors and the like interposed therebetween. In the fuel cell stack disclosed in Japanese Patent Laid-Open Publication No. 2005-108850, an inlet of a manifold for distributing liquid fuel to each of the cells and an outlet of a manifold for collecting unreacted liquid fuel discharged from the cells are provided in different end plates.

As liquid fuel passes inside a fuel cell stack, the potential thereof changes. Therefore, a potential difference is generated between the liquid fuel to be supplied to the fuel cell stack and the discharge fuel discharged from the fuel cell stack. Hence, when the discharge fuel discharged from the fuel cell stack is circulated and is resupplied to the fuel cell stack, a voltage is applied to a metal portion such as a pipe, a tank, a pump, or a heat exchanger contacting the liquid fuel. In this state, when the liquid fuel or a by-product such as formic acid contacts the metal portion, corrosion of the metal portion ensues. Furthermore, when metal ions produced by the corrosion pass through the pipe and enter the fuel cell stack, the metal ions are adsorbed onto the electrolyte membrane and cause the ionic conductivity of such to deteriorate. Thus, the performance of the fuel cell stack is reduced.

SUMMARY OF THE INVENTION

The present invention has been made in view of the aforementioned problems, and a general purpose thereof is to provide a technique for suppressing corrosion of a metal portion such as a fuel supply pipe connected to a fuel cell stack.

One embodiment of the present invention relates to a fuel cell stack which includes a stack of a plurality of cells which generate electrical power using a liquid fuel and an oxidant. The fuel cell stack is characterized in that an inlet portion of a fuel supply manifold which distributes the liquid fuel to each of the cells is electrically connected to an outlet portion of a fuel discharge manifold which discharges discharge fuel discharged from each of the cells.

According to this embodiment, the potential of the discharge fuel discharged from the fuel cell stack becomes equal to the potential of the liquid fuel to be supplied to the fuel cell stack. Hence, when the discharge fuel discharged from the fuel cell stack is circulated and is then resupplied to the fuel cell stack, the progress of corrosion of a metal portion such as a pipe, a tank, a pump, or a heat exchanger contacting the liquid fuel is suppressed.

In the fuel cell stack of the above embodiment, the inlet portion of the fuel supply manifold and the outlet portion of the fuel discharge manifold may be provided in any one of a pair of conductive end plates which sandwich the stack of the plurality of cells therebetween with a collector and an insulating body interposed between the stack and each of the end plates.

According to this embodiment, the potentials of the inlet portion of the fuel supply manifold and the outlet portion of the fuel discharge manifold are equalized through the conductive end plate. In addition to this, a pipe connected to the fuel supply manifold and a pipe connected to the fuel discharge manifold can be disposed on the same single side.

In the fuel cell stack of the above embodiment, the plurality of cells may be stacked in a vertical direction, and the end plate having the inlet portion of the fuel supply manifold and the outlet portion of the fuel discharge manifold provided therein may be disposed above the plurality of cell.

According to this embodiment, the inlet portion of the fuel supply manifold and the outlet portion of the fuel discharge manifold are provided in the same upper surface of the fuel cell stack, whereby a pipe can be easily connected to the fuel supply manifold and the fuel discharge manifold. It is to be noted that any arbitrary combination or rearrangement of the above-described structural components and so forth are all effective as and encompassed by the present embodiments. Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
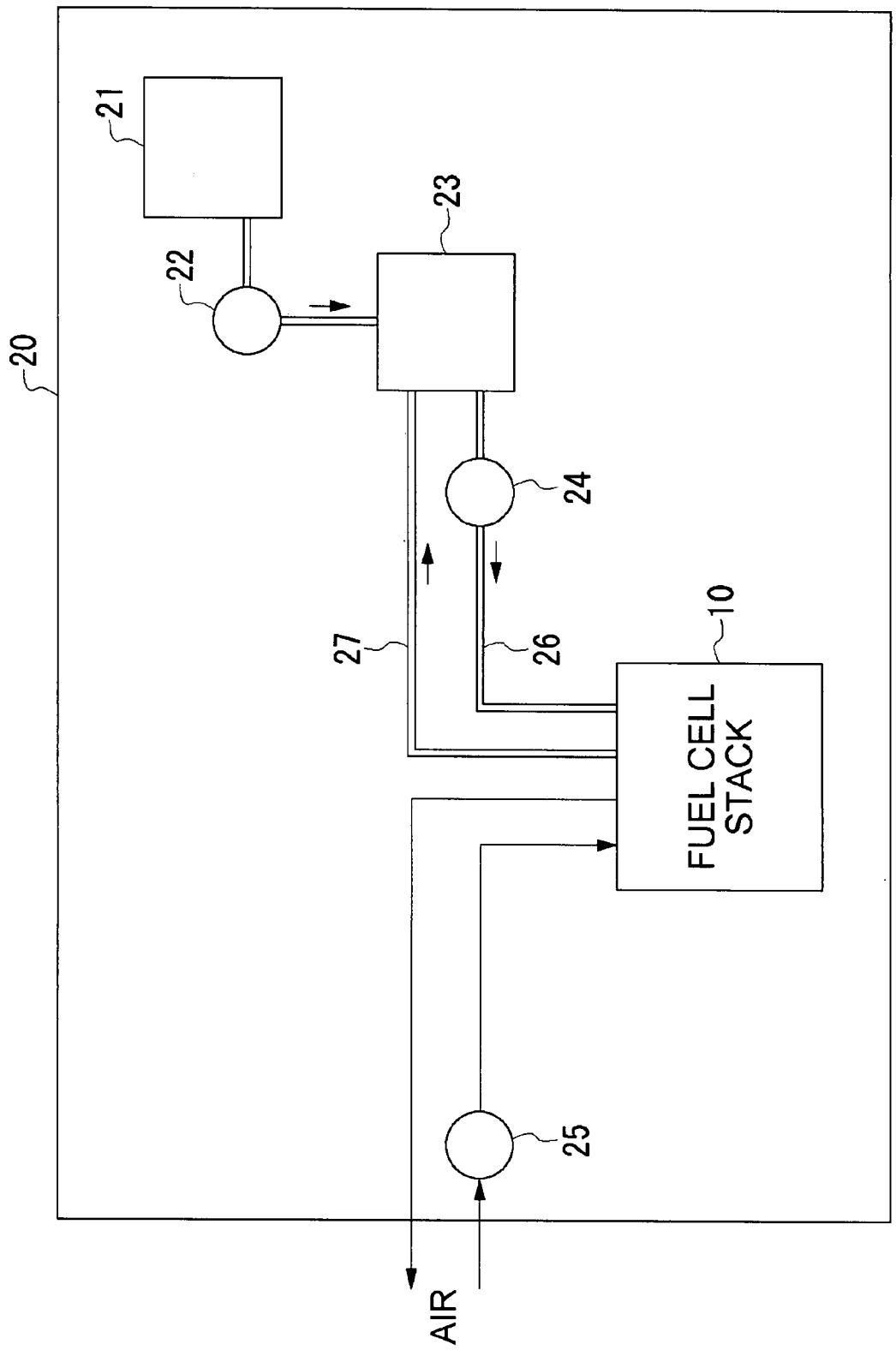
FIG. 1 is a schematic diagram showing the general configuration of a fuel cell system employing a fuel cell stack according to an embodiment.

FIG. 1 is a schematic diagram showing the general configuration of a fuel cell system 20 employing a fuel cell stack 10 according to an embodiment. The fuel cell system 20 includes the fuel cell stack 10, a fuel storage portion 21, a fuel supply pump 22, a fuel buffer tank 23, a fuel supply pump 24, and an oxidant supply pump 25.

In the fuel cell stack 10, an aqueous methanol solution and air are used to generate electrical power through an electrochemical reaction. The detailed structure of the fuel cell stack 10 will be described later.

The fuel storage portion 21 stores a concentrated aqueous methanol solution. When the concentration of the aqueous methanol solution in the fuel buffer tank 23 is decreased, the concentrated aqueous methanol solution stored in the fuel storage portion 21 is supplied as appropriate to the fuel buffer tank 23 by means of the fuel supply pump 22.

The fuel buffer tank 23 stores the aqueous methanol solution to be supplied to the fuel cell stack 10. The aqueous methanol solution stored in the fuel buffer tank 23 is diluted to a concentration in the range of 0.5 to 1.5 mol/L. The aqueous methanol solution is supplied from the fuel buffer tank 23 to the fuel cell stack 10 through a pipe 26 by means of the fuel supply pump 24. The liquid fuel remaining in the fuel cell stack 10 after the electrochemical reaction has taken place and carbon dioxide generated by the electrochemical reaction of methanol with air are collected in the fuel buffer tank 23 through a pipe 27. The carbon dioxide collected in the fuel buffer tank 23 is discharged outside the fuel cell system 20. As described above, the aqueous methanol solution is circulated through a path which includes the fuel cell stack 10 and the fuel buffer tank 23. A heat exchanger may be provided at some position along the pipe 27 to cool the liquid fuel discharged from the fuel cell stack 10. Furthermore, the liquid fuel or air to be supplied to the fuel cell stack 10 may be heated by the heat of the discharged liquid fuel.

The oxidant supply pump 25 supplies air from outside to the fuel cell stack 10. Unreacted air and some of the products such as water generated by the electrochemical reaction of methanol with air are discharged to outside the fuel cell stack 10. Alternatively, some of water generated by the electrochemical reaction may be collected in the fuel buffer tank 23.

Figure 2:
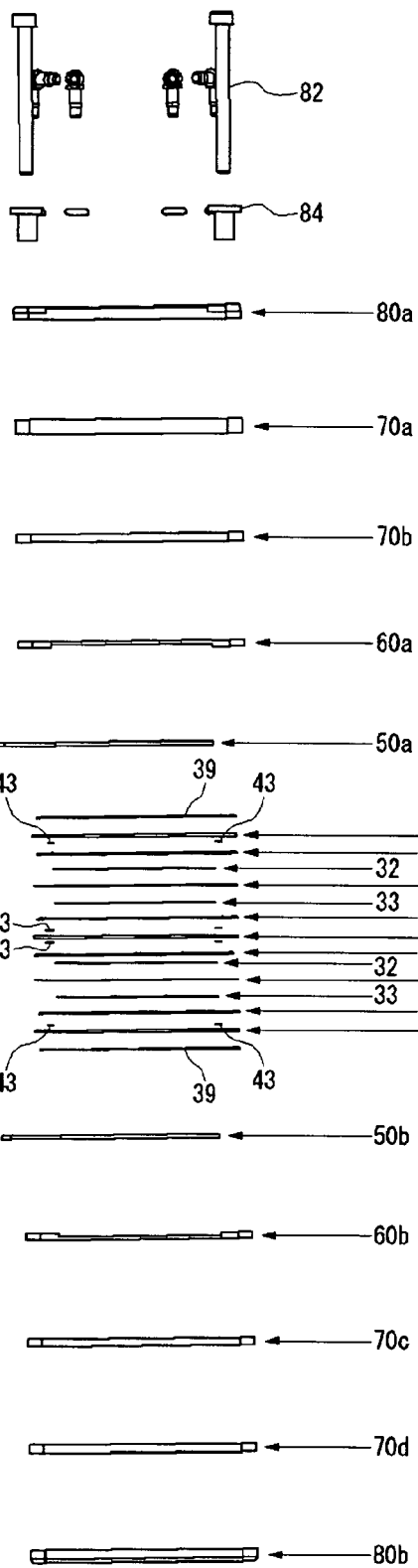
FIG. 2 is an exploded side view showing the configuration of the fuel cell system.
Figure 3:
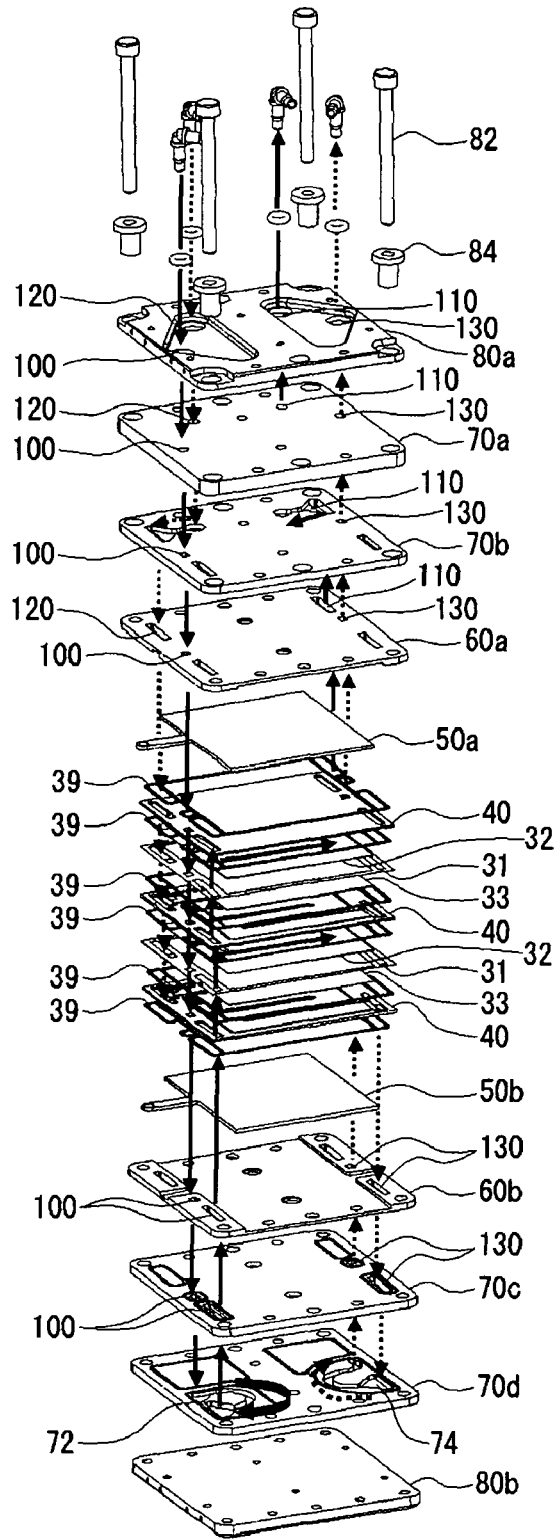
FIG. 3 is an exploded perspective view showing the configuration of the fuel cell system (the viewing direction: from the upper side to the lower side)
Figure 4:
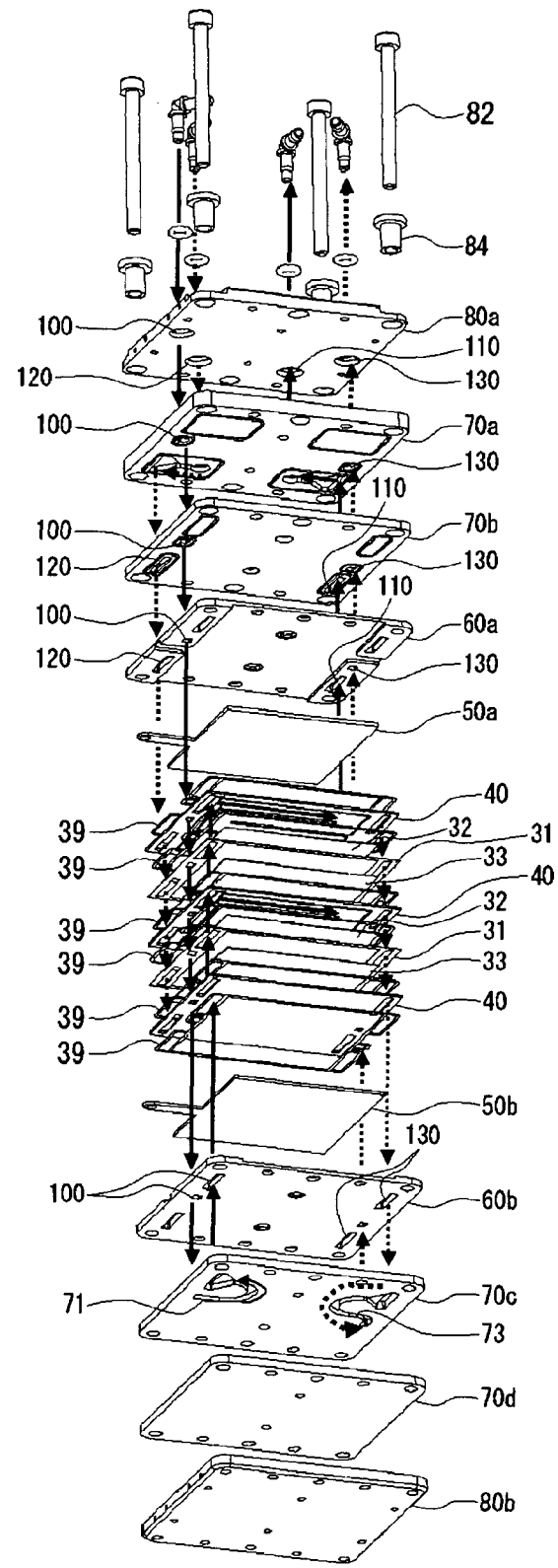
FIG. 4 is an exploded perspective view showing the configuration of the fuel cell system (the viewing direction: from the lower side to the upper side)

FIG. 2 is an exploded side view showing the configuration of the fuel cell stack 10. FIG. 3 is an exploded perspective view showing the configuration of the fuel cell stack 10 (the viewing direction: from the upper side to the lower side). FIG. 4 is an exploded perspective view showing the configuration of the fuel cell stack 10 (the viewing direction: from the lower side to the upper side).

The fuel cell stack 10 has a plurality of single cells 30, a pair of collectors 50a and 50b, a pair of insulating plates 60a and 60b, a plurality of passage-forming plates 70a, 70b, 70c, and 70d, and a pair of end plates 80a and 80b. The end plate 80a and the end plate 80b are fastened by bolts 82. The end plate 80a is insulated from the bolts 82 by an insulating member 84.

The single cells 30 are separated by a separator 40, and each of the single cells 30 has a membrane electrode assembly 31, a cathode diffusion layer 32, and an anode diffusion layer 33 and generates electrical power through the electrochemical reaction of methanol with oxygen. The plurality of single cells 30 is stacked in a vertical direction. Furthermore, the plurality of single cells 30 is electrically connected in series.

Figure 5:
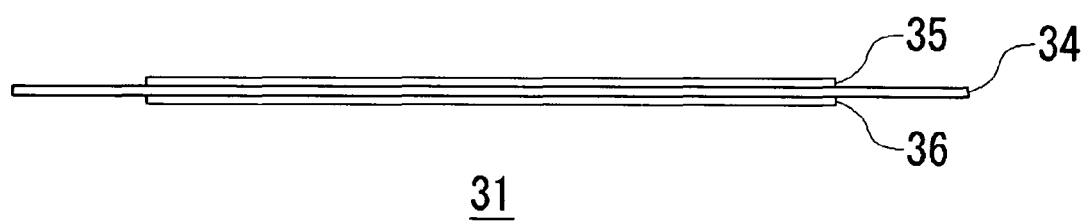
FIG. 5 is a view showing the structure of a membrane electrode assembly.

The membrane electrode assembly 31 includes an electrolyte membrane 34, an anode electrode 35 provided on the upper side of the electrolyte membrane 34, and a cathode electrode 36 provided on the lower side of the electrolyte membrane 34 (see FIG. 5). The electrolyte membrane 34 is formed from a proton conductive polymer such as Nafion (registered trademark). A platinum catalyst or a platinum-ruthenium alloy catalyst is used for the anode electrode 35, and a platinum catalyst, for example, is used for the cathode electrode 36. A porous anode diffusion layer 37 formed of carbon felt, carbon paper, or the like is provided on the upper side of the anode electrode 35. A porous cathode diffusion layer 38 formed of carbon felt, carbon paper, or the like is provided on the lower side of the cathode electrode 36.

Figure 6:
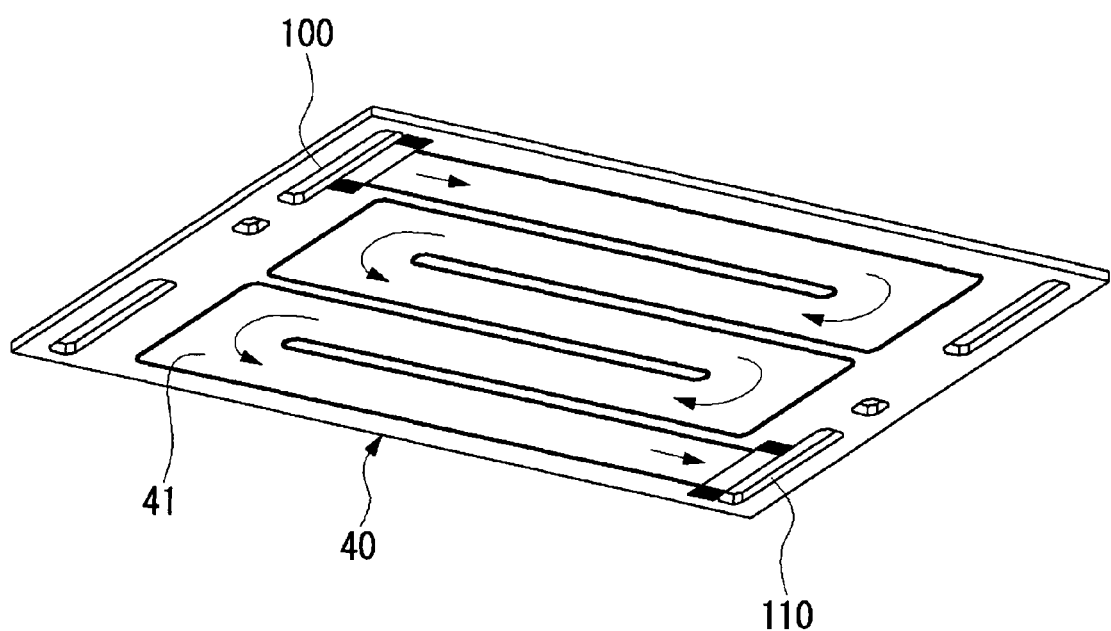
FIG. 6 is a perspective view showing a liquid fuel passage provided in the lower surface of a separator (in this perspective view, the viewing direction is from the lower side of the separator to the upper side)

As shown in FIG. 6, a liquid fuel passage 41 is provided on the lower side of the separator 40. The inlet of the liquid fuel passage 41 is connected to a fuel supply manifold 100, and the outlet of the liquid fuel passage 41 is connected to a fuel discharge manifold 110.

Figure 7:
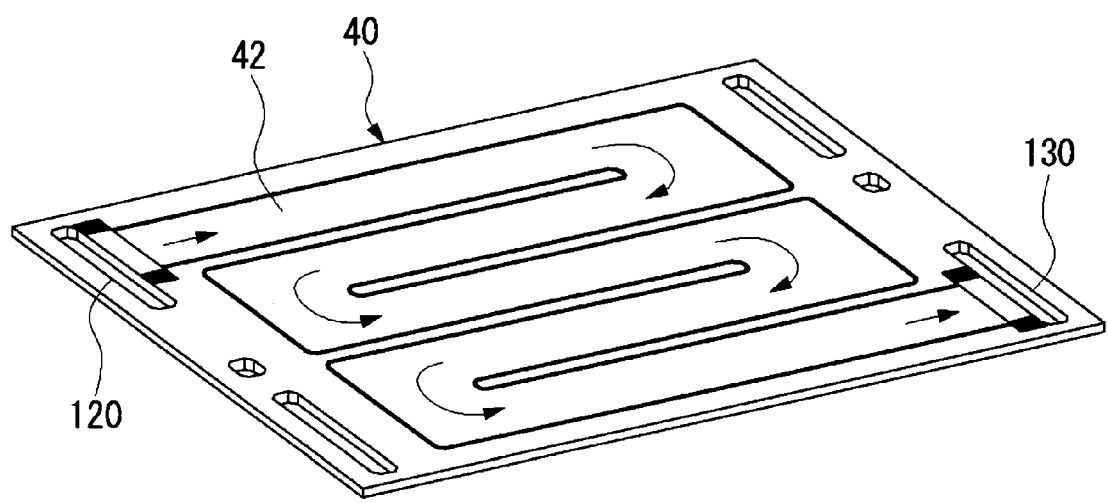
FIG. 7 is a perspective view showing a liquid fuel passage provided in the upper surface of the separator (in this perspective view, the viewing direction is from the upper side of the separator to the lower side).

Furthermore, as shown in FIG. 7, an oxidant passage 42 is formed on the upper side of the separator 40. The inlet of the oxidant passage 42 is connected to an oxidant supply manifold 120, and the outlet of the oxidant passage 42 is connected to an oxidant discharge manifold 130.

As shown in FIG. 2, a sealing member 39 such as a packing material is provided between the upper surface of the membrane electrode assembly 31 and the separator 40 provided on the upper side of the membrane electrode assembly 31 and also between the lower surface of the membrane electrode assembly 31 and the separator 40 provided on the lower side of the membrane electrode assembly 31. The sealing member 39 prevents the aqueous methanol solution and air from leaking from each of the single cells 30. A protection plate 43 is provided at the position at which the sealing member 39 crosses the liquid fuel passage 41 or the oxidant passage 42.

The collectors 50a and 50b are provided on the respective sides of the stack which is composed of the plurality of single cells 30. The collector 50a is used as a negative electrode, and the collector 50b is used as a positive electrode.

The insulating plate 60a is provided between the collector 50a and the passage-forming plate 70b. The insulating plate 60b is provided between the collector 50b and the passage-forming plate 70c. In preferred embodiments, the insulating plates 60a and 60b not only have excellent electrical insulating properties but also have other excellent characteristics such as heat resistant properties, mechanical strength, dimensional stability, and water resistance.

The passage-forming plates 70a and 70b are provided between the insulating plate 60a and the end plate 80a. Through-holes and grooves for the manifolds are formed in the passage-forming plates 70a and 70b. Furthermore, the passage-forming plates 70c and 70d are provided between the insulating plate 60b and the end plate 80b. Through-holes and grooves for the manifolds are formed in the passage-forming plate 70c. Through-holes and grooves for the manifolds are formed in the passage-forming plate 70d. Examples of a material used to form the passage-forming plates 70a, 70b, 70c, and 70d include resin and carbon.

The end plates 80a and 80b are formed from a material having a sufficient mechanical strength. Furthermore, the end plate 80a has electrical conductivity. For example, stainless steel can be used to form the end plates 80a and 80b.

The fuel supply manifold 100 is composed of a portion through which the liquid fuel falls (hereinafter, referred to as a first section), a connection portion which receives the fallen liquid fuel and changes the flow direction of the liquid fuel (hereinafter, referred to as a second section), and a portion for feeding, in the upward direction, the liquid fuel having passed through the second section (hereinafter, referred to as a third section). An inlet portion of the fuel supply manifold 100 is provided in the end plate 80a. The liquid fuel passing inside the fuel supply manifold 100 is distributed to each of the single cells 30 through the third section.

The first section of the fuel supply manifold 100 is formed by connecting through-holes provided in the end plate 80a, the passage-forming plates 70a and 70b, the insulating plate 60a, each of the separators 40, each of the membrane electrode assemblies 31, the insulating plate 60b, and the passage-forming plate 70c. The second section of the fuel supply manifold 100 is formed from grooves 71 and 72 provided in the passage-forming plates 70c and 70d, respectively. The third section of the fuel supply manifold 100 is formed by connecting through holes provided in the passage-forming plate 70c, each of the separators 40, and each of the membrane electrode assemblies 31.

An outlet portion of the fuel discharge manifold 110 is provided in the end plate 80a. The fuel discharge manifold 110 is formed by connecting through-holes provided in each of the separators 40, each of the membrane electrode assemblies 31, the insulating plate 60a, the passage-forming plate 70b, the passage-forming plate 70a, and the end plate 80a.

An inlet portion of the oxidant supply manifold 120 is provided in the end plate 80a. The oxidant supply manifold 120 is formed by connecting through-holes provided in the end plate 80a, the passage-forming plates 70a and 70b, the insulating plate 60a, each of the separators 40, and each of the membrane electrode assemblies 31.

The oxidant discharge manifold 130 is composed of a portion through which air unreacted after the electrochemical reaction and water generated by the electrochemical reaction (hereinafter, referred to as drainage gas) fall (hereinafter, referred to as a fourth section), a connection portion which receives the fallen drainage gas and changes the flow direction of the drainage gas (hereinafter, referred to as a fifth section), and a portion for feeding, in the upward direction, the drainage gas having passed through the fifth section (hereinafter, referred to as a sixth section). An outlet portion of the oxidant discharge manifold 130 is provided in the end plate 80a.

The fourth section of the oxidant discharge manifold 130 is formed by connecting through-holes provided in each of the separators 40, each of the membrane electrode assemblies 31, the insulating plate 60b, and the passage-forming plate 70c. The fifth section of the oxidant discharge manifold 130 is formed from grooves 73 and 74 provided in the passage-forming plates 70c and 70d, respectively. The sixth section of the oxidant discharge manifold 130 is formed by connecting through-holes provided in the passage-forming plate 70c, each of the separators 40, each of the membrane electrode assemblies 31, the insulating plate 60a, the passage-forming plates 70b and 70a, and the end plate 80a.

In this embodiment, the cross-sectional area of the sixth section of the oxidant discharge manifold 130 is smaller than the cross-sectional area of the fourth section. Hence, the flow velocity of the drainage gas increases in the sixth section of the oxidant discharge manifold 130, and thus the water formed as a product of the electrochemical reaction contained in the drainage gas can be discharged from the fuel cell stack 10 reliably and rapidly.

In the embodiment described above, the inlet portion of the fuel supply manifold 100 is electrically connected to the outlet portion of the fuel discharge manifold 110 through the end plate 80a. Hence, the potential of the discharge fuel discharged from the fuel cell stack 10 becomes equal to the potential of the liquid fuel being supplied to the fuel cell stack 10. Therefore, when the discharge fuel discharged from the fuel cell stack 10 is circulated and is then resupplied to the fuel cell stack 10, the progress of corrosion of a metal portion such as a pipe, a tank, a pump, or a heat exchanger contacting the liquid fuel is suppressed.

Furthermore, in the fuel cell stack 10 of the present embodiment, the inlet portion of the fuel supply manifold 100, the outlet portion of the fuel discharge manifold 110, the inlet portion of the oxidant supply manifold 120, and the outlet portion of the oxidant discharge manifold 130 are all provided in the end plate 80a. Hence, pipes connected to the respective manifolds can be arranged in a concentrated manner, and thus the paths thereof can be simplified. Therefore, the size of the fuel cell system 20 can be reduced. Furthermore, since the connecting portions connecting the manifolds to the respective pipes are positioned close to each other, the pipes can be easily installed, and the state of the various connections can be easily checked.

It should be appreciated that the present invention is not limited to the embodiments described above. Various modifications such as changes in design may be made based on the knowledge of those skilled in the art, and such modified embodiments may fall within the scope of the present invention.

In the above embodiments, the inlet portion of the fuel supply manifold 100 is electrically connected to the outlet portion of the fuel discharge manifold 110 through the end plate 80a, but the invention is not limited thereto. For example, the inlet portion of the fuel supply manifold 100 and the outlet portion of the fuel discharge manifold 110 may be formed in a conductive plate provided on a side surface of the fuel cell stack 10.

What is claimed is:

1. A fuel cell stack comprising:
   a plurality of cells which generate electrical power using a liquid fuel and an oxidant, the plurality of cells being vertically stacked;
   conductive end plates between which the plurality of cells is sandwiched;
   a collector and an insulating body between one of the end plate and the plurality of cells, and;
   an inlet portion of a fuel supply manifold which distributes the liquid fuel to each of the cells, and an outlet portion of a fuel discharge manifold which discharges discharge fuel discharged from each of the cells, the inlet portion and the outlet portion being electrically connected to each other, wherein
   the inlet portion of the fuel supply manifold and the outlet portion of the fuel discharge manifold are provided in one of the conductive end plate above the vertically stacked plurality of cells, and the fuel supply manifold comprises:

a first section through which the liquid fuel flows in a downward direction from the inlet portion of the conductive end plate above the vertically stacked plurality of cells;

a second section which receives the liquid fuel from the first section, and changes a flow direction of the liquid fuel; and a third section which receives the liquid fuel from the second section, and distributes the liquid fuel in an upward direction to each of the plurality of cells.

* * * * *